United States Patent Office 2,826,549
Patented Mar. 11, 1958

2,826,549

NAPHTHENATES AS SOLUBLE OIL EMULSIFIERS

Allan A. Manteuffel, Crystal Lake, and George R. Cook, Des Plaines, Ill., assignors to The Pure Oil Company, Chicago, Ill., a corporation of Ohio No Drawing. Application September 30, 1955
Serial No. 537,887

5 Claims. (Cl. 252—42.1)

This invention relates to soluble oil formulations and the preparation thereof. More particularly, this invention is directed towards the preparation of blend-stable and emulsion-stable soluble oils containing naphthenates as soluble oil emulsifiers.

Soluble oils comprise homogeneous mixtures of oil and emulsifiers and constitute a well-recognized type of oil. Soluble oils have the ability to form oil-in-water emulsions when added to water in various concentrations and, because of their lubricating and cooling characteristics, find extensive application in such industrial processes as metal-working operations, including cutting, shearing, grinding, grooving, extruding, cold-drawing and the like. Soluble oils are known under various names, such as emulsifiable cutting oils, certain types of spray oils, rust-proofing oils and the like.

There are two main types of emulsifiers which may be dispersed or dissolved in oil in proper proportions, along with a specific amount of a coupling agent to form a blend which will produce an oil-in-water emulsion when mixed with water. These emulsifiers are: (1) alkali metal soaps and salts of fatty acids, rosin acids, naphthenic acids, oil-soluble sulfonic acids, tall oil acids and the like; and, (2) polyethylene glycol mono-esters and alkyl mono-ethers of the aforementioned acids. Mixtures of two or more emulsifiers in a single soluble oil composition are common.

Oil-soluble sulfonates have found popularity for use as emulsifiers because of their strong emulsifying properties, anti-rust qualities, and comparatively low cost. However, soluble oil formulations in general, even those incorporating sulfonates, do not uniformly demonstrate optimum blend stability, emulsion stability, lubricity, cooling qualities, and dispersibility.

We have unexpectedly found that a superior type of soluble oil may be prepared utilizing relatively low-cost alkali metal naphthenates, rather than mahogany sulfonates or other types of emulsifiers. Our naphthenate-type soluble oils uniformly exhibit optimum long storage stability, excellent dispersibility, superior emulsion stability, lubricity and cooling properties. We are able to consistently produce such a soluble oil because we have discovered a specific and unique relation between the acid number of the soluble oil and its components. The prior art has not recognized the significance of carefully controlling the acid number, and in general suggests the use of slightly or strongly basic soluble oils. The acid number may be determined by the ASTM test D–974–54–T.

Accordingly, it is an object of this invention to provide a storage-stable, emulsion-stable soluble oil of controlled acidity.

It is also an object of this invention to provide an improved soluble oil containing alkali metal naphthenates.

It is another object of this invention to provide a method whereby a soluble oil may be produced having a low acid number, high storage stability, low cost and great ease of preparation.

This invention generally relates to an improved alkali metal naphthenate-containing soluble oil composition of low acidity and a method of preparing it so that enhanced emulsion stability and blend storage stability result.

More specifically, the present invention provides a method of producing an emulsion-stable and storage-stable soluble oil, which contains alkali metal naphthenates as the emulsifying agent, by means of adjusting the acid number of the formulation to a critical range of 0.5–4.0. Accordingly, the present invention provides the following procedural steps: addition of petroleum-derived naphthenic acids or alkali metal salts thereof and a coupling agent to the base oil, and careful adjustment of the acid number of the blend to a desired range of 0.5–4.0 by the addition of a neutralizing agent, such as aqueous potassium hydroxide, sodium hydroxide solution, triethanolamine, etc.

A particular point of novelty of this invention lies in the utilization of a specific acid number range in combination with alkali metal naphthenates in order to produce a superior soluble oil, in contra-distinction to the prior art which employs either a small or large excess of base, and a consequently low or high base number in soluble oil formulations or a relatively large excess of acids.

The base oil of our soluble oil formulation may comprise any one or a plurality of mineral oils boiling within the petroleum lubricating oil range. Thus, any single lubricating oil or combination of lubricating oils and/or extracts thereof are contemplated. By extracts are meant fractions obtained by extracting lubricating oil fractions with a selective solvent conventionally used for such purposes, such as phenol, sulfur dioxide, furfural, and the like. The lubricating oil may be derived from any petroleum crude oil, such as Gulf Coast, Van Zandt, Pennsylvania, Mid-Continent, etc., and may be solvent-refined or conventionally refined. Frequently, the lubricating oil or extract has some residual acidity, contributed principally by naturally occurring naphthenic acids, which is substantially neutralized and utilized as additional naphthenate salt during adjustment of the acid number. The lubricating oil may be of high, medium or low viscosity. The base oil for the blend may contain any percentage of extract oils, from 0 to 100%, and is present in the soluble oil in a major amount, preferably 75–93% by weight of the total composition.

As the first part of step one of the process of our invention, a preparation of petroleum-derived naphthenic acids is added to the base oil. Alternatively, alkali metal naphthenates may be added to the base oil. The naphthenic acids may be obtained from petroleum oil sources by any suitable means. Naphthenic acids may be recovered from naphthenic-acid-rich petroleum oils or oil fractions, for example, by the use of ammonia in water as per U. S. 2,186,249, January 9, 1940; they may also be prepared by treatment with alkali, then alcohol, as in U. S. 1,681,657, August 21, 1928. Alcoholic KOH solution was used in 2,424,168, July 15, 1947. Various other methods of selectively extracting naphthenic acids, such as with amines, also may be used. The naphthenic acids, upon separation from their sources and removal of the extraction medium, are subjected to saponification in situ after addition to the oil, or to saponification with alkali metal hydroxides before addition to the base oil. Naphthenic acids having average molecular weights of 280 to 500 may be used as the emulsifying agent in our formulation. Acid number is directly related to the assay of naphthenic acids of a given molecular weight range, i. e., the higher the acid number the higher the assay. Higher acid numbers are generally preferred for ease of handling. The naphthenic acid preparation or the alkali metal naphthenate preparation may be added to the base oil in any manner, preferably after preheating to about 120°

F. in the case of the naphthenic acids, with thorough stirring until the acids or salts thereof are uniformly dispersed throughout the oil. The naphthenic acids are utilized in an amount of about 1–20% by weight of the total composition, at least 4% of acid (158 acid No.) being preferred. The amount required depends upon the level of emulsion rating desired. When alkali metal naphthenates are utilized, the naphthenic acid equivalents are present in the above-mentioned percentages by weight.

The coupling agent which acts to promote the oil-water emulsion characteristics may be any effective agent, specifically, diethylene glycol, hexylene glycol, propanol, etc. The coupling agent is added in small amounts, approximately 1–3% by weight of the final composition, in any convenient manner, but preferably with stirring to ensure dispersion of the compound throughout the entire liquid. The coupling agent may be added to the base oil before, with, or after the naphthenic acids, preferably after the naphthenic acids have been added.

The second step of our process comprises the addition, after careful determination of the requisite amount, of the neutralizing agent which is necessary to adjust the acid number of the finished soluble oil to a value between 0.5 and 4.0. The neutralizing agent comprises a basic organic or inorganic reagent, such as triethanolamine, sodium hydroxide, potassium hydroxide, etc. Aqueous potassium hydroxide solution is generally preferred as the neutralizing agent when naphthenic acids are present in the base oil, and the caustic solution is prepared sufficiently in advance to permit cooling and water restoration. The mixture becomes cloudy upon the addition of neutralizing agent, and again when the coupling agent is added, but in each case the mixture clears during subsequent agitation. It should be clearly understood that when a portion or all of the required amount of naphthenic acids are already present in the base oil, there is no essential difference in the method of neutralizing to fall within the critical range for acid number. The neutralizing agent converts most of the naphthenic acids present into naphthenate salts when the acid number of the blend is carefully adjusted, as noted above, to a range of 0.5–4.0 acid number. The acid number is the criterion which indicates the amount of free acid present in the soluble oil. It is expressed as the number of milligrams of potassium hydroxide required to neutralize all of the acidic constituents present in one gram of the soluble oil sample (see ASTM test D–974–54T for further details). The amount of neutralizing agent added necessarily depends on the acidity of the soluble oil and the concentration of the neutralizing agent. The ratio of acid number to the percent free acidity (as oleic) is approximately 2:1.

In order to further illustrate the process and the compounds of our invention, the following specific, non-limiting examples are presented:

Example I

Approximately 782 lbs. of naphthenic acids of 320–330 average molecular weight preheated to about 120° F. were discharged into an open kettle containing 14,677 lbs. of an aromatic extract oil having the following specifications and obtained by phenol extraction of mineral lubricating oil fraction:

Acid number, approximately 4.1 to 4.6, usually 4.13
API gravity, 16 to 17°
Flash, 365 to 380° F.
Fire, 420 to 435° F.
Viscosity/100° F., 160 to 180 SUS
Viscosity/210° F., 39 to 41 SUS
V.I., −20 to −27

The naphthenic acids had the following characteristics:

Ash as sulfate, 0.20% by weight
Iodine number, 23.7
Acid number, 157
Saponification number, 164

Approximately 281 lbs. of coupling agent, diethylene glycol, was then added with stirring to the naphthenic acid-base oil mixture. Potash solution, comprising approximately 185.1 lbs. of 85% assay potassium hydroxide and 129.6 lbs. of water, was added with stirring to the mixture. When the mixture became clear, an acid number of approximately 1.37 resulted. The finished soluble oil had the following additional characteristics: API gravity of 5.3, ash as sulfate of 1.42%, and a viscosity at 100° F. of 301.2 SUS, and its composition was:

| Component: | Wt. percent |
|---|---|
| Naphthenic acids (157 acid No.) | 4.87 |
| Diethylene glycol | 1.75 |
| Potassium hydroxide | 0.98 |
| Water | 0.98 |
| Base oil (4.4 acid No.) | 91.42 |

Emulsions were prepared with the above soluble oil with both soft and synthetic hard water to determine the emulsion characteristics of the oil. The synthetic hard water was prepared by adding the following chemicals to 10 liters of distilled water and bubbling $CO_2$ through the solution until the chemicals were completely dissolved:

| | Grams |
|---|---|
| Calcium carbonate, anhydrous | 1.000 |
| Calcium chloride, anhydrous | 0.250 |
| Calcium sulfate, anhydrous | 2.500 |
| Magnesium carbonate, anhydrous | 1.000 |
| Sodium sulfate, anhydrous | 1.000 |

Emulsion test A (MIL–C–4339 USAF Specification 25 Sept. 1951 emulsion test 4.5) was used to measure the emulsion stability of the soluble oil. The test is performed as follows: 5 ml. of the soluble oil is added to 45 ml. of the synthetic hard water contained in a 100 ml. graduated cylinder. The temperature of the liquid is adjusted to 77 ±5° F. The mixture is then stirred vigorously for 5 minutes with a paddle-like apparatus consisting of a copper plate 4¾″ long, ¾–⅞″ wide and 1/16″ thick, at a speed of 100 R. P. M. The paddle is thereafter withdrawn from the emulsion and held above it so that most of the emulsion clinging to it drains back into the cylinder. The cylinder is allowed to stand at 77±5° F. for 15 minutes, inspected for presence of froth, then allowed to stand undisturbed for 24 hours at the same temperature before inspection for separation. Creaming, that is, formation of a creamy emulsion tending to rise to the top without actually separating as a layer of fine oil, is not considered a separation. The volume of oil separating from the emulsion in 24 hours should not exceed 2% of the total volume of the emulsion.

The soluble oil of Example I showed no froth after 15 minutes and only a non-disqualifying separation of 1% "creaming" after 24 hours. The soluble oil of Example I was also subjected to emulsion test B, which is emulsion test A as above-described, but with ratios of oil-to-water of 1 to 10 and 1 to 50, both with distilled and synthetic hard water. Emulsion stability was demonstrated for all four samples, with only a trace of creaming after 24 hours.

A spot test (MIL–C–4339 USAF Spec. 25 Sept. 1951 spot test 4.7.1) was also run on Example I soluble oil. The test is performed according to the following procedure: Test panels, approximately 2″ square, of aluminum alloy, copper, and low-carbon steel, are polished to a finish of 6–8 micro-inches root-mean-square, and finish-cleaned with magnesium oxide and water until free from water-break. The test panels are rinsed in distilled water, then 95% ethyl alcohol, and are dried and placed polished side up on a glass or non-corroding surface. About 1.5 ml. of the emulsion, prepared with 20 parts by volume test oil and 80 parts by volume distilled water, is placed on each test panel. A specimen of tin-lead solder of surface area of not less than one square inch is also rinsed in distilled water and alcohol, dried and treated with the emulsion. These specimens are allowed to stand at 77 ±9° F. and 50 ±5% relative humidity for 168 hours. They are then washed with distilled water, ethyl alcohol and ASTM precipitation naphtha, and are blown dry with compressed air. The specimens are examined for discoloration and other evidence of corrosion, such as etching, etc. The soluble oil of Example I showed a slight discoloration with copper, no stain with steel, a moderately light discoloration with aluminum and slight bluing with solder, all acceptable by the standards of the test.

The soluble oil of Example I was further subjected to an immersion test (MIL-C-4339 USAF Spec. 25 Sept. 1951 immersion test 4.7.2) conducted in the following manner: Test strips about ½″ by 3″ (solder 3″ by at least ⅟₁₆″) of the same metals as described in the above spot-test are subjected to the same polishing, cleaning and rinsing procedures, then are placed in individual test tubes. Sufficient test emulsion, prepared with 20 parts by volume test oil to 80 parts by volume distilled water, is added to each test tube to completely immerse the strip, after which the tube is tightly stoppered and allowed to stand upright at 100 ±7° F. for 168 hours. The strips are removed, washed, cleaned and examined for discoloration, pitting, etching and other evidence of corrosion.

The soluble oil of Example I showed only a trace discoloration with the copper, steel and aluminum strips and trace bluing with the solder strip. In addition, the soluble oil showed good dispersion properties.

*Example II*

A soluble oil was prepared in accordance with the procedure of Example I and with similar ingredients, but to a higher emulsifier level by the following proportions:

| Components: | Wt. Percent |
|---|---|
| Naphthenic acids (157 acid No.)[1] | 7.84 |
| Diethylene glycol | 2.86 |
| Potassium hydroxide | 1.25 |
| Water | 1.25 |
| Aromatic extract oil (acid number 4.40)[2] | 86.80 |

[1] Same characteristics as napthenic acids of Example I.
[2] Same as the aromatic extract oil of Example I, except for acid number, as indicated.

The above composition had an acid number of 2.95, an API gravity of 14.8°, ash as sulfate of 1.84%, and a viscosity at 100° F. of 306.3 SUS. Trace creaming was noted in the emulsion test B after 24 hours with all four samples. No frothing was noted after 15 minutes in emulsion test A, but there was a trace of creaming after 24 hours. In the spot test, the soluble oil produced slight discoloration with copper, very slight discoloration with steel, light discoloration with aluminum and slight bluing with solder. In the immersion test, the soluble oil produced no stain with copper, trace discoloration with steel, moderate discoloration with aluminum and no stain with solder. Thus, the results of these tests were all satisfactory. In addition, the composition had satisfactory dispersion properties.

*Example III*

A soluble oil was prepared in accordance with Example I procedure and had the folowing composition:

| Components: | Wt. Percent |
|---|---|
| Naphthenic acids[1] | 7.64 |
| Diethylene glycol | 2.87 |
| Potassium hydroxide | 1.21 |
| Water | 1.19 |
| Aromatic extract oil (acid number 4.13)[2] | 87.09 |

[1] The naphthenic acids were of 354 average molecular weight and were of 158 acid number.
[2] Same oil as in Example I.

The finished soluble oil had the following characteristics:

Acid number _____ 3.24.
Ash as sulfate _____ 1.77%.
Viscosity at 100° F. _____ 263 SUS.
API gravity _____ 15.0°.

No frothing was obtained in emulsion test A with the soluble oil emulsion after 15 minutes, and only light creaming resulted after 24 hours. Trace creaming was observed for all samples in emulsion test B after 24 hours. In the spot test, the soluble oil showed slight bluing, no stain, slight discoloration, and slight bluing with copper, steel, aluminum and solder, respectively, while in the immersion test it showed slight discoloration, trace discoloration, slight discoloration and trace bluing with the same test metals. Again, all test requirements were passed.

*Example IV*

A soluble oil prepared in accordance with the procedure of Example I had the following composition:

| Components: | Wt. percent |
|---|---|
| Naphthenic acids[1] | 5.19 |
| Diethylene glycol | 2.25 |
| Potassium hydroxide | 0.973 |
| Water | 0.957 |
| Aromatic extract oil (3.80 acid number)[2] | 90.63 |

[1] The naphthenic acids were of 354 molecular weight and 158 acid number (same acids as Example III).
[2] Essentially same characteristics as extract oil in Example III.

The finished soluble oil had the following characteristics:

Acid number _____ 1.84.
Ash as sulfate _____ 1.52%.
API gravity _____ 15.5°.
Viscosity at 100° F _____ 239 SUS.

When the soluble oil was tested for emulsion stability according to emulsion test B, at the end of 24 hours, a trace of creaming was noticed in each instance. With emulsion test A, no frothing of the emulsion was found after 15 minutes, and after 24 hours a non-disqualifying 2% oil separation was obtained. In the spot test, slight discoloration, no stain, very slight discoloration, and silght bluing were obtained with copper, steel, aluminum and solder, respectively, while in the immersion test using the same order of metals, slight discoloration, trace discoloration and trace bluing were obtained. All test results were satisfactory.

*Example V*

A soluble oil was prepared, in accordance with Example I procedure, with the following composition:

| Components: | Wt. percent |
|---|---|
| Naphthenic acids (157 acid No.)[1] | 4.87 |
| Diethylene glycol | 1.75 |
| Potassium hydroxide | .67 |
| Water | 1.00 |
| Aromatic extract oil (4.13 acid number)[2] | 91.71 |

[1] The naphthenic acids were prepared from lubricating distillate and had an average molecular weight of 354.
[2] Same oil as in Example I.

The soluble oil was characterized by a high acid number of 5.0. When the oil was subjected to emulsion test A, a disqualifying 4% of oil separated. When the oil was subjected to emulsion test B, the following results were obtained. With 1 to 10 ratio of oil-to-water, a 4% oil separation was noted with the distilled water emulsion, and the product was non-emulsifiable in hard water. With a 1 to 50 ratio of oil-to-water there was a 2% oil separation from distilled water emulsions, and an emulsion could not be formed in hard water. The oil could not be tested by the spot or immersion tests because of the poor quality of the emulsion. Thus, it is seen that when the naphthenic acid-containing soluble oil composition has a final acid number above about 4.0, decreased emulsion stability to the extent of non-emulsifiability occurs in comparison with the excellent results obtained with comparable formulations of 0.5–4.0 acid number.

*Example VI*

A soluble oil was prepared in accordance with Example I procedure to give the following formulation:

| Composition: | Weight percent |
|---|---|
| Naphthenic acids [1] | 4.87 |
| Diethylene glycol | 1.75 |
| Potassium hydroxide | 1.35 |
| Water | 1.00 |
| Aromatic extract oil (4.13 acid number) [2] | 91.03 |

[1] The naphthenic acids were prepared from lubricating oil stock and had an acid number of 158 and an average molecular weight of 354.
[2] Same oil as in Example V.

The above soluble oil was characterized by a base number of 2.09. When this soluble oil was tested by emulsion test A, 3.5% oil separation occurred. Emulsion test B showed the following results: With 1 to 10 ratio there was 4% oil separation from distilled water emulsions, and the soluble oil was non-emulsifiable in hard water. With 1 to 50 ratio there was a 2% oil separation from the distilled water emulsion, and the soluble oil was again non-emulsifiable in hard water. The oil could not be tested by the spot or immersion tests because of the poor nature of the emulsion. Thus, it is seen from the above that when the naphthenic acid-containing soluble oil formulation had a low base number, decreased emulsion stability to the extent of non-emulsifiability occurred in comparison with the excellent results obtained with formulations of 1.0–4.0 acid number.

Criticality is clearly demonstrated for the compositions of Examples I, II, III, and IV since only these compositions pass all four tests characterizing an acceptable general-purpose soluble oil; that is, they pass emulsion tests A and B, the spot test and the corrosion test. In addition, all demonstrate superior dispersability in water, either hard or soft, so that emulsification is quickly and uniformly reached. Each of these compositions is characterized by an acid number within the critical acid number range using alkali metal naphthenates as the emulsifiers. But, as shown by Example V, an acid number over 4.0, viz., 5.0, results in failure to pass any of the tests described and required for a satisfactory soluble oil, and unsatisfactory dispersion and emulsion ratings occur. As shown by Example VI, a low base number of 2.09 also results in failure to pass any of the established tests revealing unsatisfactory dispersion and emulsion characteristics and demonstrates the non-equivalency of low acid numbers and low base numbers for naphthenate-containing compositions.

Although each of the above examples incorporated aromatic extract oil as the base oil in the soluble oil formulation, any one or a plurality of unextracted mineral oils boiling within the petroleum lubricating oil range, or any raffinate oil thereof or any combination of the above oils, with or without extract oils, may be used in the soluble oil formulation with equal facility and comparable results. However, should the base oil used contain a smaller amount of naphthenic acids than the aromatic extract oils of the above examples, it is necessary to add a small amount of naphthenic acids to the formulation to compensate for such decreased content of naphthenic acids in the base oil and to keep the ultimate naphthenate salt concentration in the soluble oil at the same level as in the above examples.

If base oils and/or naphthenic acids of acid numbers other than those specified in the example are used, the formulation must be correspondingly modified, since the total acid number contribution by the extract and naphthenic acids (acid number contribution is equal to the sum of the products of percentage times acid number for each component) must be as specified for any given formulation. If the extract (or other mineral oil) has a zero acid number, the required acidity is attained by the addition of naphthenic acids, in which case the percent increase in naphthenic acids is subtracted from the amount of mineral oil otherwise required. For example, in Example I, 4.87 wt. percent of naphthenic acids having a 157 acid number, and 91.42 wt. percent of a base oil having a 4.4 acid number, were utilized. The total "acid number contribution" was 11.668 units, of which 7.646 units were contributed by the naphthenic acids, and 4.022 units were contributed by the base oil. If a "neutral" base oil (zero acid number) had been used in place of the 4.4 acid number extract, and the naphthenic acids had had an acid number of 154, 7.58 wt. percent of these naphthenic acids, 88.71 wt. percent of the neutral oil would have been required.

Although satisfactory soluble oils have been prepared utilizing high base numbers, approximately 14 and above, in conjunction with naphthenate emulsifiers, the soluble oil of our invention is less costly, simpler to prepare, and is endowed with superior soluble oil properties, including marked storage stability, excellent emulsion stability and low corrosivity, which render it unique as a general-purpose soluble oil.

The soluble oil of our invention, which contains naphthenates as the emulsifying agent and has an acid number of 0.5–4.0, may be modified, as is within the skill of one versed in the art, by the addition of any suitable ingredient for its own properties, such as an assisting agent, an additional emulsifier, a supplemental corrosion inhibitor, extreme pressure additive, foam depressant and the like. In each case, after addition of the new ingredient, a correction should be made for any resulting change in acidity, so that the final formulation stays within the 0.5–4 acid number range, which has been shown to assure superior soluble oil characteristics with naphthenate-containing soluble oils.

We claim and particularly point ous as our invention:

1. An emulsion-stable soluble oil composed of 87–95% by weight of petroleum lubricating oil aromatic solvent extract of approximately 3–4 acid number, diethylene glycol as a coupling agent in the amount of about 2.25–2.9% by weight, 4–7.7% by weight of an emulsifier-forming agent consisting substantially only of naphthenic acids having a molecular weight of 280–500 and an acid number of 157–159, about 0.8–1.25% by weight of potassium hydroxide, and about 0.9–1.2% by weight of water, said soluble oil having an acid number of about 1.4 to 3.2.

2. An emulsion-stable soluble oil which passes emulsion test A (MIL-C-4339 USAF Specification 25 Sept. 1951 emulsion test 4.5), said oil having the following formulation:

| | Wt. percent |
|---|---|
| Naphthenic acids of 354 average molecular weight and an acid number of 158 | 7.64 |
| Diethylene glycol | 2.87 |
| Potassium hydroxide | 1.21 |
| Water | 1.19 |
| Aromatic petroleum extract oil (4.13 acid number) | 87.09 | said oil having an acid number of 3.24.

3. An emulsion-stable soluble oil which passes emulsion test A (MIL-C-4339 USAF Specification 25 Sept. 1951 emulsion test 4.5), said oil having the following formulation:

| | Wt. percent |
|---|---|
| Naphthenic acids of 320–330 average molecular weight and an acid number of 157 | 4.87 |
| Diethylene glycol | 1.75 |
| Potassium hydroxide | 0.98 |
| Water | 0.98 |
| Aromatic petroleum extract oil (4.4 acid number) | 91.42 | said oil having an acid number of approximately 1.37.

4. An emulsion-stable soluble oil which passes emulsion test A (MIL-C-4339 USAF Specification 25 Sept. 1951 emulsion test 4.5), said oil having the following formulation:

| | Wt. percent |
|---|---|
| Naphthenic acids of 320–330 average molecular weight and an acid number of 157 | 7.84 |
| Diethylene glycol | 2.86 |
| Potassium hydroxide | 1.25 |
| Water | 1.25 |
| Aromatic petroleum extract oil (4.40 acid number) | 86.80 | said oil having an acid number of 2.95.

5. An emulsion-stable soluble oil which passes emulsion test A (MIL-C-4339 USAF Specification 25 Sept. 1951 emulsion test 4.5), said oil having the following formulation:

| | Wt. percent |
|---|---|
| Naphthenic acids of 354 average molecular weight and an acid number of 158 | 5.19 |
| Diethylene glycol | 2.25 |
| Potassium hydroxide | 0.973 |
| Water | 0.957 |
| Aromatic petroleum extract oil (3.80 acid number) | 90.63 | said oil having an acid number of 1.84.

References Cited in the file of this patent

UNITED STATES PATENTS

| | | |
|---|---|---|
| 2,230,556 | Zimmer | Feb. 4, 1941 |
| 2,231,214 | Nelson | Feb. 11, 1941 |
| 2,289,536 | Bradley | July 14, 1942 |
| 2,413,353 | Hunter | Dec. 31, 1946 |
| 2,655,478 | Deutser | Oct. 13, 1953 |